(12) United States Patent
Goel

(10) Patent No.: US 8,266,474 B2
(45) Date of Patent: Sep. 11, 2012

(54) FAST CLUSTER FAILURE DETECTION

(75) Inventor: Garima Goel, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/717,909

(22) Filed: Mar. 4, 2010

(65) Prior Publication Data

US 2011/0219263 A1 Sep. 8, 2011

Related U.S. Application Data

(60) Provisional application No. 61/274,123, filed on Dec. 30, 2009.

(51) Int. Cl.
*G06F 11/00* (2006.01)
(52) U.S. Cl. .............................. 714/4.2; 714/43; 709/224
(58) Field of Classification Search .................. 714/4.2, 714/43, 4.1, 4.3
See application file for complete search history.

(56) References Cited

U.S. PATENT DOCUMENTS

| | | | | |
|---|---|---|---|---|
| 6,363,495 B1 * | 3/2002 | MacKenzie et al. | ........... | 714/4.5 |
| 6,801,949 B1 * | 10/2004 | Bruck et al. | ................ | 709/232 |
| 7,039,694 B2 * | 5/2006 | Kampe et al. | ................ | 709/222 |
| 7,287,180 B1 * | 10/2007 | Chen et al. | ...................... | 714/4.3 |
| 7,437,426 B2 * | 10/2008 | Joshi et al. | ..................... | 709/213 |
| 7,490,089 B1 * | 2/2009 | Georgiev | ................ | 707/999.01 |
| 7,516,285 B1 * | 4/2009 | Haynes et al. | ................. | 711/162 |
| 7,653,682 B2 * | 1/2010 | Erasani et al. | ................ | 709/201 |
| 7,739,677 B1 * | 6/2010 | Kekre et al. | ................... | 717/168 |
| 7,757,236 B1 * | 7/2010 | Singh | ............................ | 718/105 |
| 7,797,565 B1 * | 9/2010 | Tran et al. | ....................... | 714/4.1 |
| 2005/0185646 A1 * | 8/2005 | Karino et al. | ................. | 370/389 |
| 2006/0291459 A1 * | 12/2006 | Bain | ............................ | 370/389 |
| 2007/0022138 A1 * | 1/2007 | Erasani et al. | ............. | 707/104.1 |

* cited by examiner

*Primary Examiner* — Scott Baderman
*Assistant Examiner* — Elmira Mehrmanesh

(57) ABSTRACT

A method and system for fast failure detection in a distributed computer system. The method includes executing a distributed computer system having a plurality of clusters comprising at least a first cluster, a second cluster and the third cluster, and initializing failure detection by creating a connected cluster list in each of the plurality of clusters, wherein for each one of the plurality of clusters, a respective connected cluster list describes others of the plurality of clusters said each one is communicatively connected with. A status update message is sent upon changes in connectivity between the plurality of clusters, and generating an updated connected cluster list in each of the plurality of clusters in accordance with the status update message. The method then determines whether the change in connectivity results from a cluster failure by examining the updated connected cluster list in each of the plurality of clusters.

18 Claims, 9 Drawing Sheets

FAST CLUSTER FAILURE DETECTION

This patent application claims the benefit of U.S. Provisional Patent Application, Ser. No. 61/274,123, filed Dec. 30, 2009, which is incorporated by reference herein in its entirety.

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is multiply connected via storage area networks or Internet protocol-based storage. Additionally, HA clusters are often augmented by connecting them to multiple redundant HA clusters to provide disaster recovery options.

The high availability and disaster recovery solutions strive to decrease the application downtime and application data loss. In case of a disaster like they flood, earthquake, hurricane, etc., the applications running in the impacted cluster should be failed over to another cluster at the earliest to ensure that the business continuity is maintained. In order to facilitate fast failover of the applications, the cluster failures should be detected in the timely manner. Conventional high availability and disaster recovery solutions rely on inquiry mechanism to determine the health of a particular cluster. This reactive approach has the drawback that it increases the delay in cluster failure detection and it requires lot of message exchanges between the clusters at the time of disaster. Therefore, a proactive approach is needed to decrease the cluster failure detection time.

SUMMARY OF THE INVENTION

Embodiments of the present invention provide a proactive approach of distinguishing between network outage and cluster failure in disaster recovery environment. In disaster recovery environment, embodiments of the present invention can significantly decrease cluster failure detection time, thereby decreasing the application downtime and application data loss at the time of disaster.

In one embodiment, the present invention is implemented as a method for fast failure detection in a distributed computer system. The method includes executing a distributed computer system having a plurality of clusters comprising at least a first cluster, a second cluster and the third cluster, and initializing failure detection by creating a connected cluster list in each of the plurality of clusters, wherein for each one of the plurality of clusters, a respective connected cluster list describes others of the plurality of clusters said each one is communicatively connected with. The method further includes sending a status update message upon a change in connectivity between the plurality of clusters, and generating an updated connected cluster list in each of the plurality of clusters in accordance with the status update message. The method then determines whether the change in connectivity is a result of a cluster failure by examining the updated connected cluster list in each of the plurality of clusters.

In one embodiment, a determination is made as to whether the change in connectivity is a result of a communications link failure by examining the updated connected cluster list in each of the plurality of clusters.

In one embodiment, the status update message comprises a name of a cluster with which a connection was established or broken.

In one embodiment, each of the plurality of clusters maintains a respective connected cluster list created by others of the plurality of clusters.

In one embodiment, at the time of establishing a communication link, each of the plurality of clusters updates and exchanges their respective connected cluster list with others of the plurality of clusters.

In one embodiment, upon receiving a loss of communication status update message from the second cluster, the third cluster removes the first cluster from a connected cluster list of the second cluster, and wherein the third cluster checks a connected cluster list of the third cluster to determine whether the third cluster is connected to another cluster to which the first cluster is also connected.

In one embodiment, the third cluster declares a failure of the first cluster and updates its respective connected cluster list accordingly, when the third cluster is not connected to another cluster to which the first cluster is also connected.

In one embodiment, the third cluster recognizes the health of the first cluster and updates its respective connected cluster list accordingly, when the third cluster is connected to another cluster to which the first cluster is also connected.

In another embodiment, the present invention is implemented as a computer readable storage medium having stored thereon, computer executable instructions that, if executed by a computer system cause the computer system to perform a method that includes the steps of executing a distributed computer system having a plurality of clusters comprising at least a first cluster, a second cluster and the third cluster, and initializing failure detection by creating a connected cluster list in each of the plurality of clusters, wherein for each one of the plurality of clusters, a respective connected cluster list describes others of the plurality of clusters said each one is communicatively connected with. A status update message is sent upon a change in connectivity between the plurality of clusters. An updated connected cluster list is generated in each of the plurality of clusters in accordance with the status update message. A determination is made as to whether the change in connectivity is a result of a cluster failure by examining the updated connected cluster list in each of the plurality of clusters.

In yet another embodiment, the present invention is implemented as server computer system, that includes a computer system having a processor coupled to a computer readable storage media and executing computer readable code. The computer readable code causes the computer system to implement a failure detection agent that functions by initializing failure detection by creating a connected cluster list, wherein for each one of the plurality of clusters, a respective connected cluster list describes others of the plurality of clusters said each one is communicatively connected with, and sending a status update message upon a change in connectivity between the plurality of clusters. The failure detection agent further functions by generating an updated connected cluster list in in accordance with the status update message, and determining whether the change in connectivity is a result of a cluster failure by examining the updated connected cluster list for each of the plurality of clusters.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
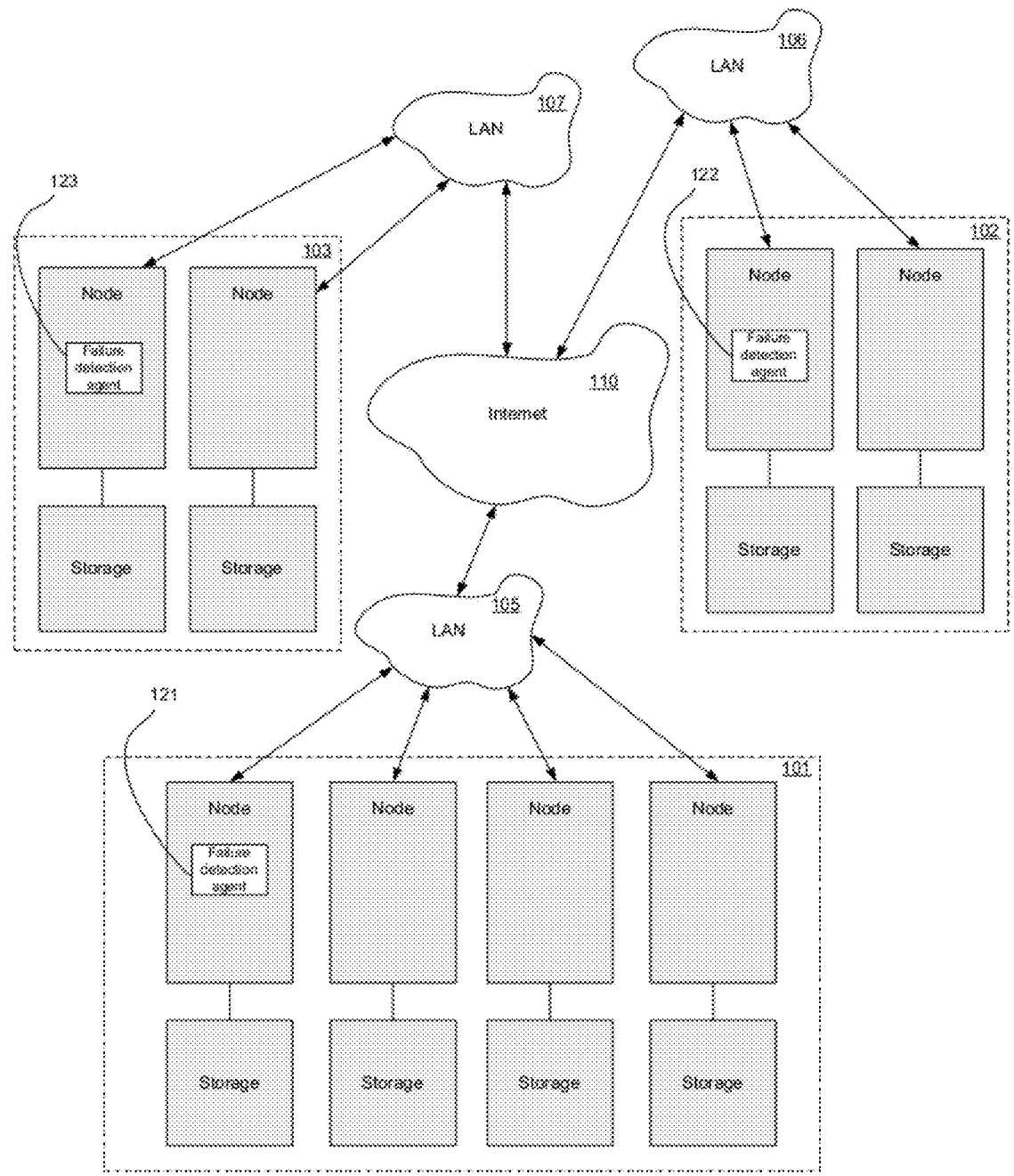
FIG. 1 shows a diagram depicting a high availability multi-cluster-based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement a proactive approach of distinguishing between network outage and cluster failure in disaster recovery environment. In disaster recovery environment, this approach can be used to significantly decrease cluster failure detection time, thereby decreasing the application downtime and application data loss at the time of disaster. Decreasing cluster failure detection time by few seconds can prevent business organizations deploying the high availability and disaster recovery solutions, from incurring significant financial loss.

FIG. 1 shows a diagram depicting a high availability multi-cluster-based computing system in accordance with one embodiment of the present invention. As illustrated in FIG. 1, three clusters 101-103 are shown. The clusters 102-103 each comprise a two node cluster. Cluster 101 comprises a four node cluster. Each of the constituent nodes is shown connected to a respective storage device (e.g., disk drive, etc.). The nodes of each cluster communicate with one another via local area networks 105-107. These local area networks are in turn connected to the Internet 110. Although the embodiments described in the context of clusters of two nodes and four nodes, it should be appreciated that embodiments of the present invention can readily scale and function in distributed computer systems and/or cloud based computer systems having hundreds or thousands of nodes.

Thus, FIG. 1 shows the basic layout of a typical high-availability multi-cluster computer system environment. As described above, a high availability cluster is a computer cluster that functions primarily by providing high availability of services to users and/or applications. The multiple redundant nodes of each cluster 101-103 are used to provide service in case one or more nodes of a cluster should fail. For example, if a node with a particular application crashes, the application will be unavailable until the node is recovered. HA clustering implements a fail over of the particular application to one of the redundant nodes of the cluster.

FIG. 1 also shows the inclusion of a plurality of failure detection agents 121-123 in each of the clusters 101-103. The failure detection agents 121-123 implement the fast cluster failure detection functionality of embodiments of the present invention. In addition to failing over one or more nodes to a redundant node within a cluster, embodiments of the present invention utilize redundant clusters to provide failover support to a failed cluster. Embodiments of the present invention enable the fast detection of a failed cluster, thereby enabling the smooth failover of applications to one or more redundant clusters. In the FIG. 1 embodiment, there exists at least one failure detection agent instantiated in each cluster, however, to provide redundancy, reliability, and the like, failure detection agents can be instantiated on each node of a given cluster.

Figure 2:
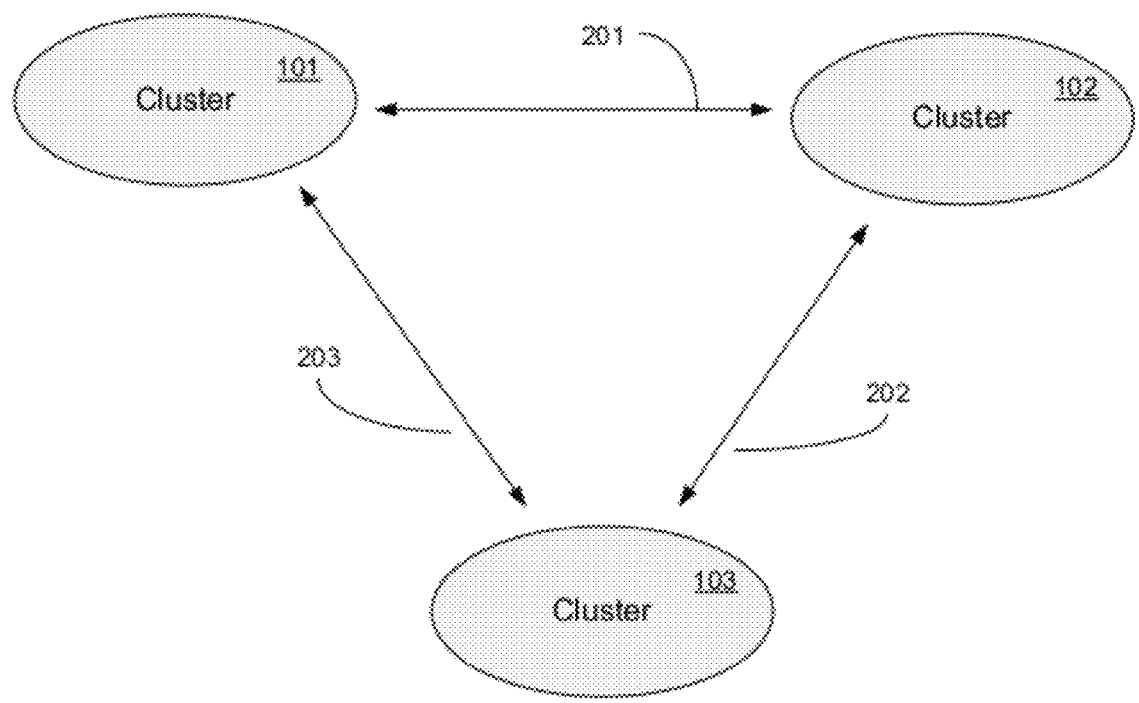
FIG. 2 shows a diagram depicting the communications pathways between the clusters in accordance with one embodiment of the present invention.

FIG. 2 shows a diagram depicting the communications pathways between the clusters 101-103 in accordance with one embodiment of the present invention. As described above, a tightly-coupled distributed computing system typically consists of multiple clusters of computing nodes which communicate with each other in order to facilitate processing of the computation tasks. At the time of failure of one cluster, the other clusters in the distributed system take over the tasks that were assigned to the failed cluster prior to the failure. A cluster can lose communication with another cluster because of loss of network connectivity or because of the failure of that cluster. In order to accurately detect a cluster failure, the clusters need to differentiate between a network outage and a cluster failure.

Currently, the high availability and disaster recovery solutions rely on inquiry protocol to distinguish between network outage and cluster failures in multi-cluster environment. If there is a loss of communication between two clusters, then each of the two clusters (if they are alive) send an inquiry request message to other clusters which acts as a "witness", in order to determine the health of the cluster with which the communication is lost.

Upon receiving the inquiry request message, the inquired clusters or witnesses check if they are able to communicate with the cluster for which the inquiry was made. Based on that, they send back affirmative or negative inquiry response to the cluster that sent the inquiry request message. Based on the inquiry responses from the inquired clusters, the inquiring cluster determines whether the communication loss is because of a network outage or cluster failure.

The inquiry protocol mentioned above increases the cluster failure detection time since the inquiring cluster has to wait for the inquiry responses from the inquired clusters. This delay in cluster failure detection is more apparent in case of a busy cluster or congested network. Also, a response timeout is needed to make sure that the inquiring cluster does not wait forever for a response from the inquired clusters. This protocol also has a drawback that for each pair of clusters, two messages are exchanged between the two clusters at the time of network outage or a cluster failure.

Figure 3:
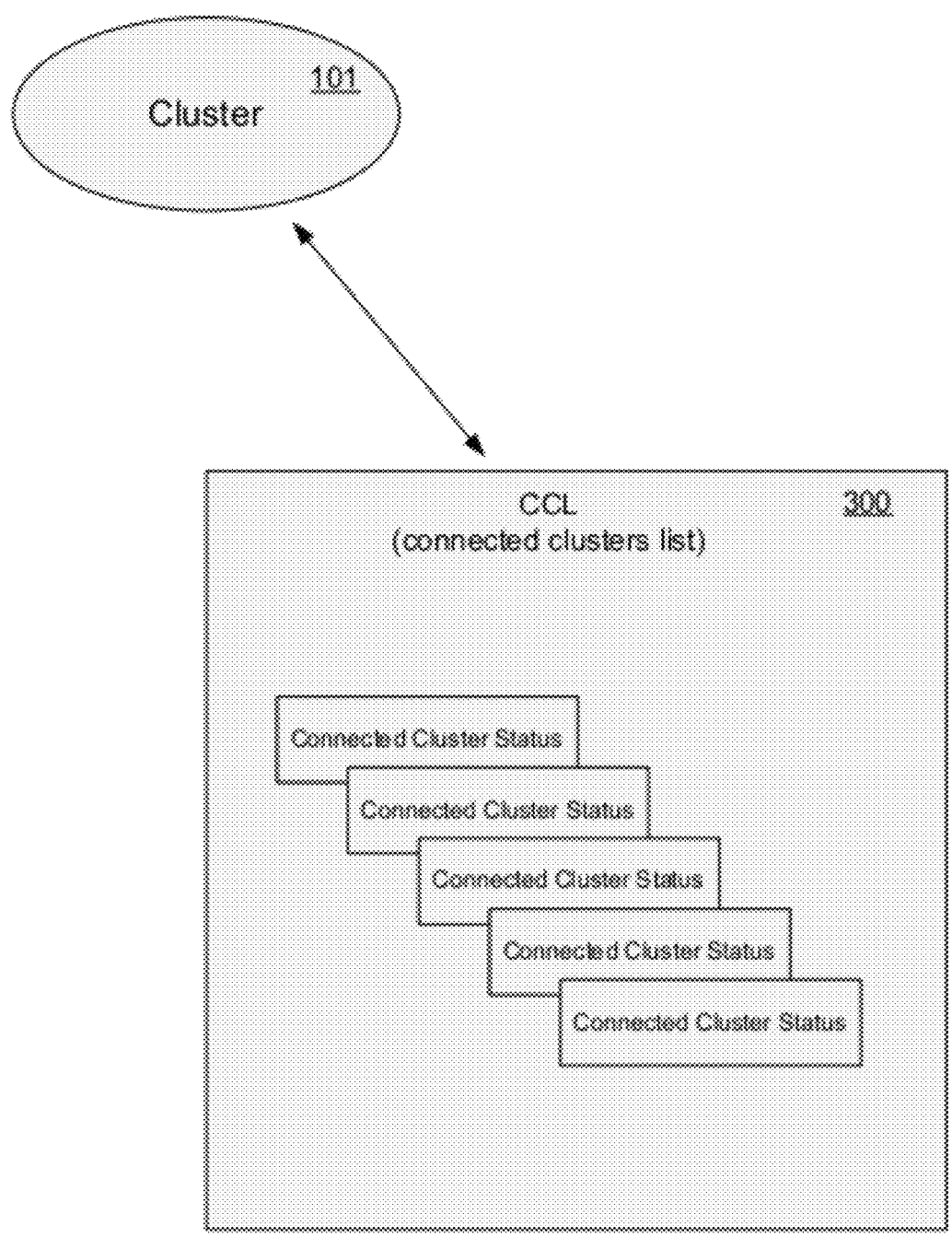
FIG. 3 shows a diagram of a connected clusters list as maintained by a cluster in accordance with one embodiment of the present invention.

FIG. 3 shows a diagram of a connected clusters list as maintained by a cluster 101 in accordance with one embodiment of the present invention. To improve the above inquiry protocol in terms of number of message exchanges and cluster failure detection time, embodiments of the present invention implement a status update protocol to rapidly detect cluster failure. In one embodiment, as depicted in FIG. 3, each cluster would maintain a connected clusters list (CCL) that describes all the clusters to which it is connected. At the time of establishing the connection, a group of connected clusters (e.g., clusters 101-103 of FIG. 2) would update and exchange their CCLs with the other clusters. Also, in one embodiment, whenever a cluster establishes or breaks connection with another cluster, that cluster would send a status update message to all other clusters (e.g., as listed in CCL) to which it is connected.

Figure 4:
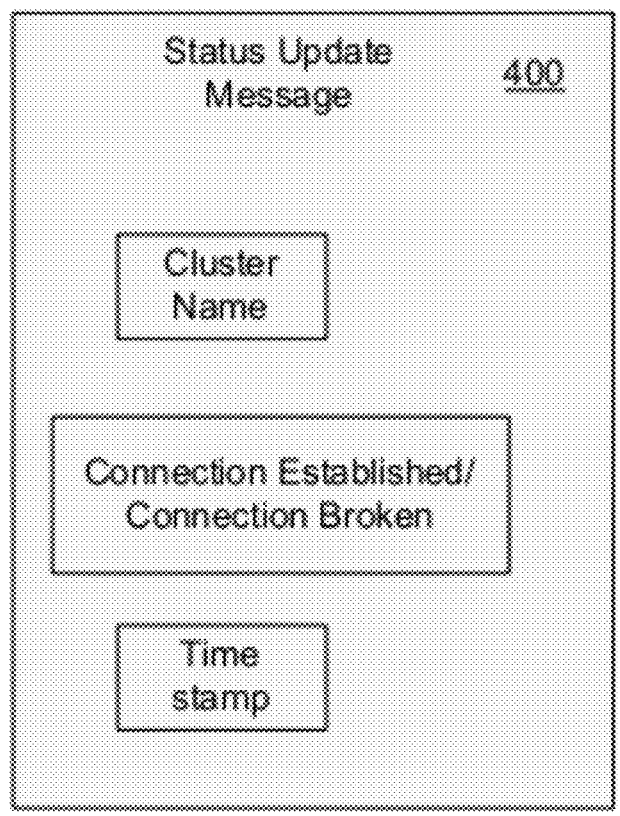
FIG. 4 shows a diagram of an exemplary status update message in accordance with one embodiment of the present invention.

FIG. 4 shows a diagram of an exemplary status update message 400 in accordance with one embodiment of the present invention. In one embodiment, the status update message can include, among other things, the name of the cluster, whether the connection was just established or broken, and a time stamp of the event, as shown in FIG. 4. Upon receiving the status update message a cluster will update the CCL of the cluster from which status update message was received. Therefore, at the time of loss of connectivity with a cluster, the other clusters would just refer to the CCL for that particular cluster, to determine if the cluster is alive or not.

Thus, for the rationale described above, it can be seen that the Status Update protocol of embodiments of the present invention eliminates the need for inquiring other clusters at the time of network outage and cluster failure, and therefore, decreases the number of message exchanges. The Status Update protocol also eliminates the need for having a response timeout, and therefore, significantly decreases the failure detection time for a cluster.

To better illustrate the benefits of using embodiments of the Status Update protocol, several network outages and cluster failure scenarios are described and compared below.

Figure 5:
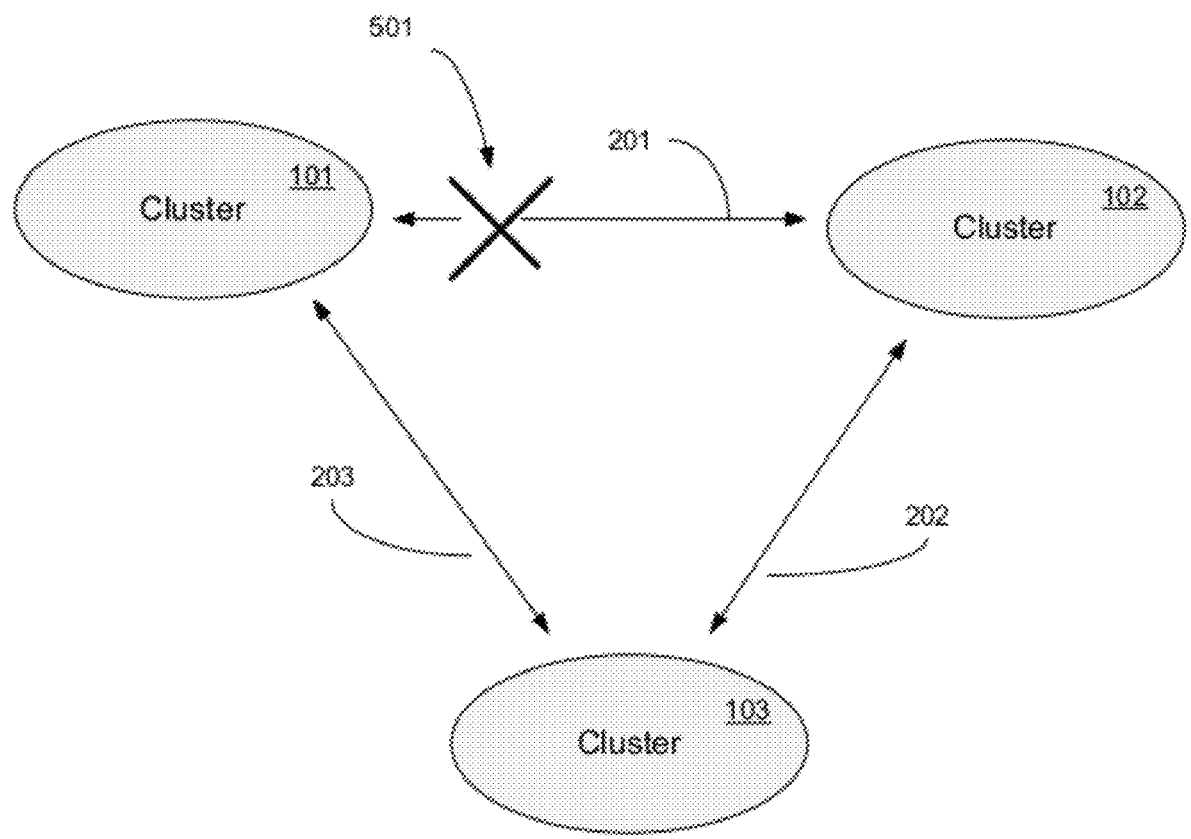
FIG. 5 shows a case where there exists a communications network outage between two clusters in accordance with one embodiment of the present invention.

FIG. 5 shows a case where there exists a communications network outage 501 between clusters 101 and 102 in accordance with one embodiment of the present invention. As described above, the three clusters C1, C2 and C3 (e.g., clusters 101, 102 and 103 respectively) are usually fully connected to each other in normal operation.

In a conventional case, with Inquiry protocol, if there is a loss of communication between C1 and C2 because of the failure of network between C1 and C2, then following actions would take place.

a) C1 would send an inquiry request message to C3 to inquire about the state of C2.
b) C2 would send an inquiry request message to C3 to inquire about the state of C1.
c) Since the network between C3 and C2 is still up, C3 would send an inquiry response message to C1 indicating that it is able to communicate with C2.
d) Since the network between C3 and C1 is still up, C3 would send an inquiry response message to C2 indicating that it is able to communicate with C1.
e) Upon receiving the inquiry response message from C3, C1 would reach the conclusion that the C2 cluster is up and only the network connectivity between C1 and C2 is lost.
f) Upon receiving the inquiry response message from C3, C2 would reach the conclusion that the C1 cluster is up and only the network connectivity between C2 and C1 is lost.

As can be seen, in the above described conventional case, 4 message (2 messages between C1 and C3 and 2 messages between C2 and C3) exchanges would take place at the time of the network failure 501. Also, a response timeout is needed so that the clusters C1 and C2 do not wait forever if the messages cannot be exchanged with cluster C3 due to network outage or some other issue.

Figure 6:
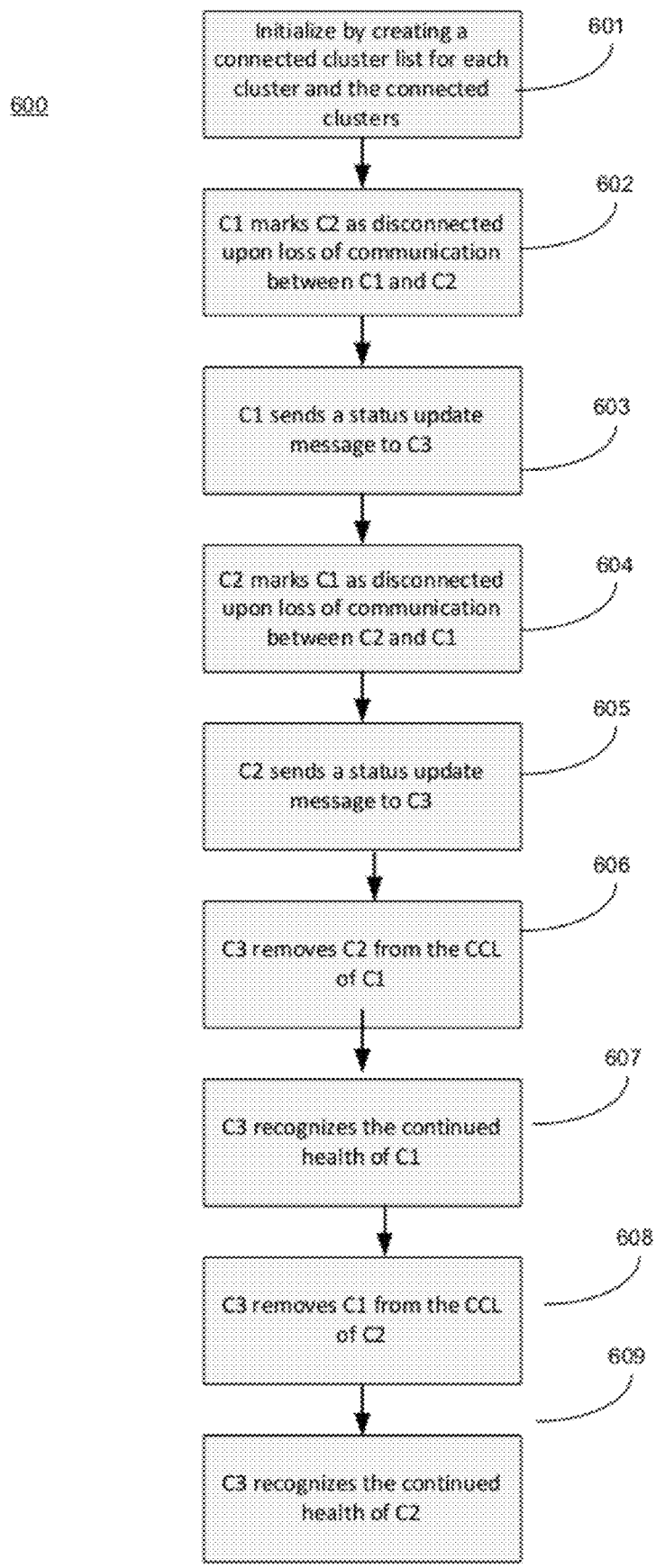
FIG. 6 shows a flowchart of a process depicting the operation of the Status Update protocol in case of a network outage in accordance with one embodiment of the present invention.

FIG. 6 shows a flowchart of a process 600 depicting the operation of the Status Update protocol in case of a network outage in accordance with one embodiment of the present invention. The failure detection functionality is primarily implemented by the failure detection agents executing on the clusters.

As shown in FIG. 6, process 600 begins in step 601, where as described above, in one embodiment of the Status Update protocol, each cluster would initialize itself by creating a Connected Cluster List (CCL) for itself and all the clusters to which it is connected at the time of establishing the connections with the clusters. Therefore, in case of the configuration where C1, C2 and C3 are fully connected to each other, each cluster would maintain the following CCLs:

CCL for C1: C2, C3
CCL for C2: C1, C3
CCL for C3: C1, C2

In Status Update protocol, if there is a loss of communication between C1 and C2 because of the failure of network between C1 and C2 (e.g., failure 501), then following actions would be take place. In step 602, C1 would mark C2 as "DISCONNECTED". C1 would then remove C2 from the CCL of C1. C1 would delete the CCL of C2. C1 would check the CCL of C1 to see if C1 is connected to any other cluster to which C2 is also connected. In step 603, since C1 is connected to C3 and C3 is also connected to C2, C1 would send a status update message to C3 indicating loss of communication with C2.

In step 604, C2 would mark C1 as "DISCONNECTED". C2 would remove C1 from the CCL of C2. C2 would then delete the CCL of C1. C2 would check CCL of C2 to see if C2 is connected to any other cluster to which C1 is also connected. In step 605, since C2 is connected to C3 and C3 is also connected to C1, C2 would send a status update message to C3 indicating loss of communication with C1.

In step 606, upon receiving the status update message from C1, C3 would remove C2 from the CCL of C1. In step 607, since C3 is still connected to C1, C3 recognizes the continued health of C1 and accordingly, C3 does not declare a cluster failure of C1.

In step 608, upon receiving the status update message from C2, C3 would remove C1 from the CCL of C2. In step 609, since C3 is still connected to C2, C3 recognizes the health of C2 and accordingly, C3 does not declare a cluster failure of C2.

As can be seen in the above description, with the fast failure detection functionality provided by embodiments of the present invention, a failure detection scenario is implemented where only 2 message exchanges (e.g., 1 message between C1, C3 and 1 message between C2, C3) would take place at the time of the network failure. Additionally, it should be noted that a response timeout is not needed by any of the clusters, which saves a significant additional amount of time.

Figure 7:
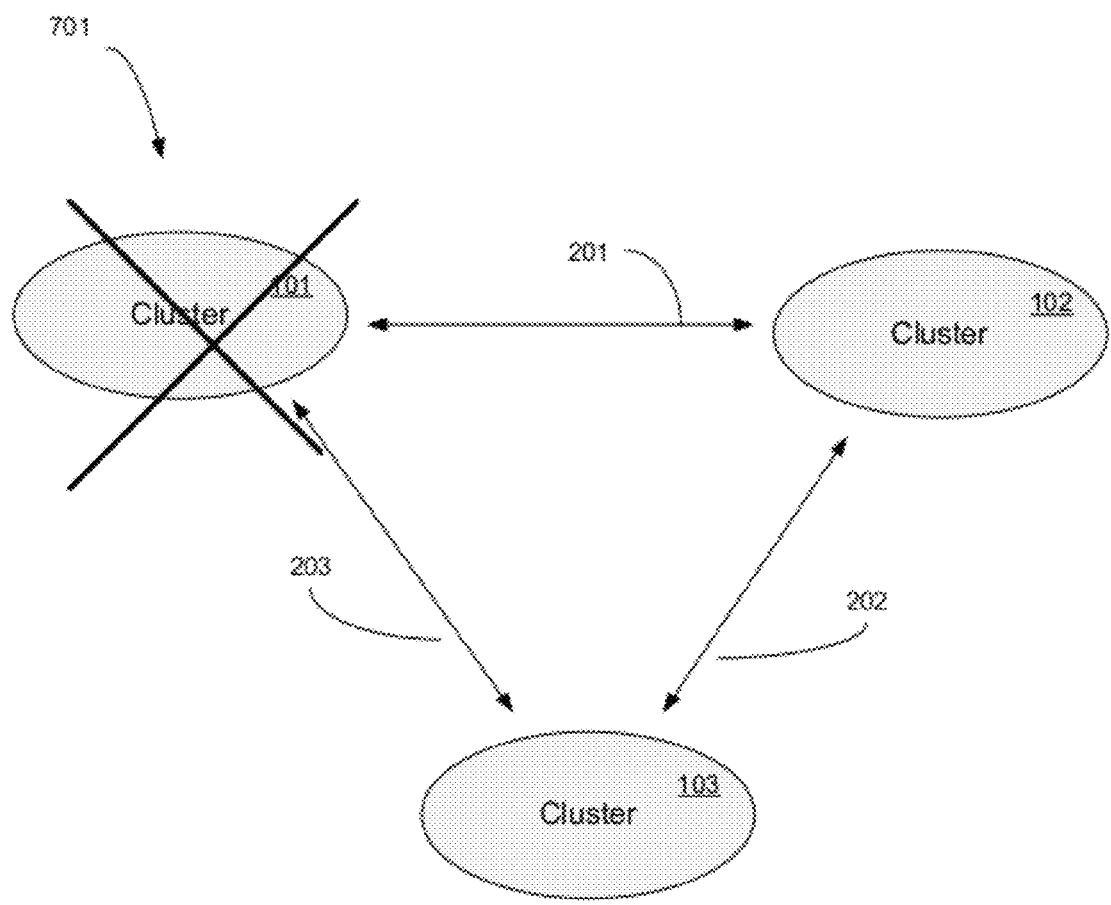
FIG. 7 shows a case where there exists a cluster failure in accordance with one embodiment of the present invention.

FIG. 7 shows a case where there exists a cluster failure of cluster 101 in accordance with one embodiment of the present invention. As described above, the three clusters C1, C2 and C3 (e.g., clusters 101, 102 and 103 respectively) are usually fully connected to each other in normal operation.

In a conventional case, with Inquiry protocol, at the time of cluster failure of C1 (e.g., a failure event 701), the following actions would take place.

a) C2 would send inquiry request message to C3 inquiring about the state of C1.
b) C3 would send inquiry request message to C2 asking about the state of C1.
c) Since C2 is not able to communicate with C1, C2 would send inquiry response message to C3 indicating that it is not able to communicate with C1.
d) Since C3 is not able to communicate with C1, C3 would send inquiry response message to C2 indicating that it is not able to communicate with C1.
e) Upon receiving the inquiry response from C3, C2 would reach the conclusion that the cluster C1 is down. Therefore, C2 would declare the cluster failure for C1.
f) Upon receiving the inquiry response from C2, C3 would reach the conclusion that the cluster C1 is down. Therefore, C3 would declare the cluster failure for C1.

As we can see, 4 message exchanges between C2 and C3 would take place at the time of the cluster failure. Also, a response timeout is needed so that the clusters C2 and C3 do not wait forever.

Figure 8:
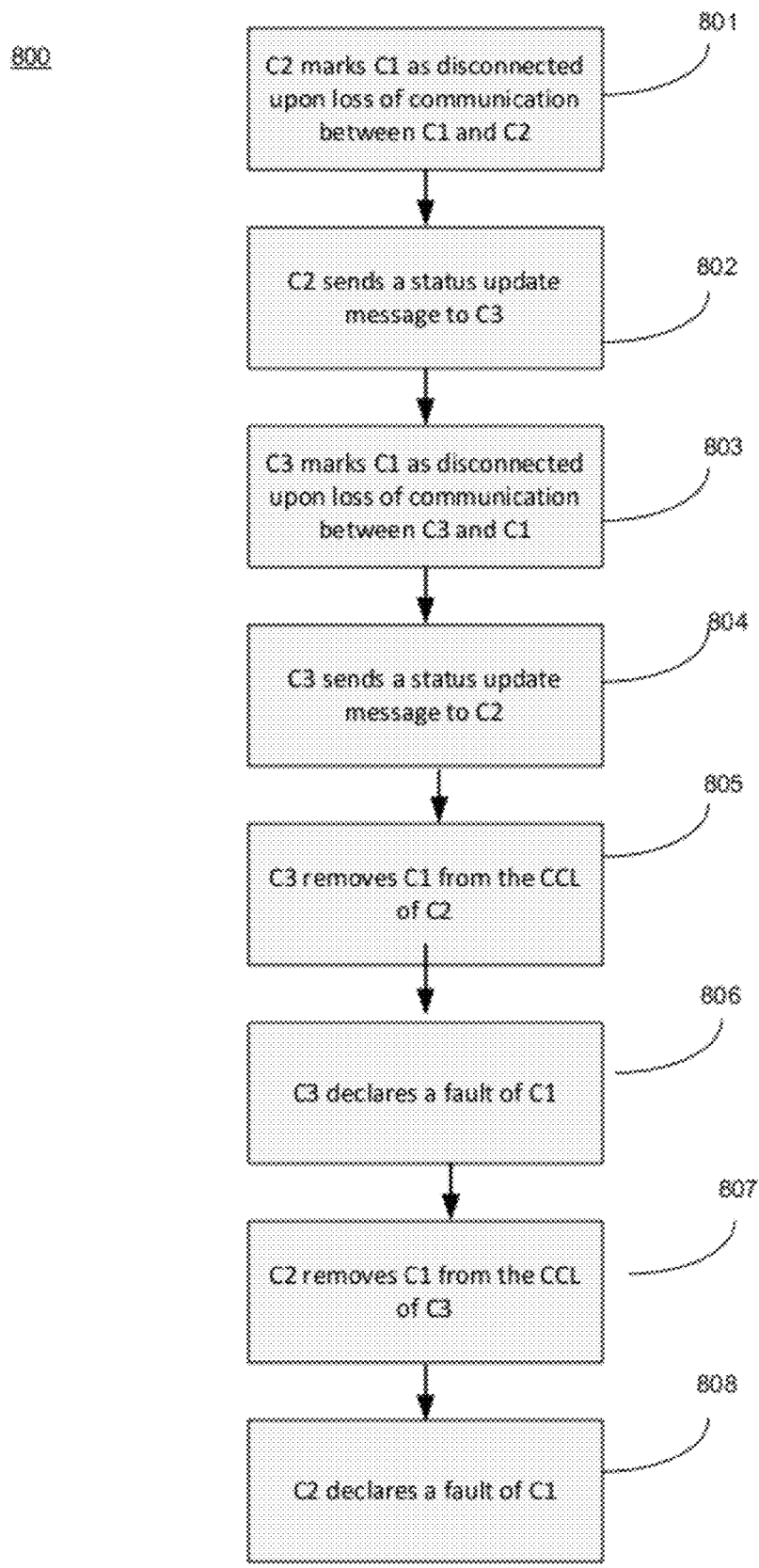
FIG. 8 shows a flowchart of a process depicting the operation of the Status Update protocol in case of a cluster failure in accordance with one embodiment of the present invention.

FIG. 8 shows a flowchart of a process 800 depicting the operation of the Status Update protocol in case of a cluster failure in accordance with one embodiment of the present invention. As described above, the failure detection functionality is primarily implemented by the failure detection agents executing on the clusters.

Process 800 begins in step 801, where, because of the failure event, C2 would mark C1 as "DISCONNECTED". C2 would remove C1 from the CCL of C2. C2 would delete the CCL of C1. C2 would check the CCL of C2 to see if C2 is connected to any other cluster to which C1 is also connected. In step 802, since C2 is connected to C3 and C3 is connected to C1, C2 would send a status update message to C3 indicating loss of communication with C1.

In step 803, C3 would mark C1 as "DISCONNECTED". C3 would remove C1 from the CCL of C3. C3 would delete the CCL of C1. C3 would check the CCL of C3 to see if C3 is connected to any other cluster to which C1 is also connected. In step 804, since C3 is connected to C2 and C2 is connected to C1, C3 would send a status update message to C2 indicating loss of communication with C1.

In step 805, upon receiving the status update message from C2, C3 would remove C1 from the CCL of C2. Since C3 is no longer connected to C1, C3 would check the CCL of C3 to see if C3 is connected to any other cluster to which C1 is also connected. In step 806, if there are none (as in this case), C3 would declare the cluster failure of C1 and mark C1 as "FAULTED".

In step 807, upon receiving the status update message from C3, C2 would remove C1 from the CCL of C3. Since C2 is no longer connected to C1, C2 would check the CCL of C2 to see if C2 is connected to any other site to which C1 is also connected. In step 808, if there are none (as in this case), C2 would declare the cluster failure of C1 and mark C1 as "FAULTED".

Thus, as can be seen from the above description, the fast failure detection functionality of embodiments of the present invention implement a failure detection scenario where only 2 message exchanges between C2 and C3 would take place at the time of cluster failure. Additionally, it should be noted that a response timeout is not needed by any of the clusters, which saves a significant additional amount of time.

Figure 9:
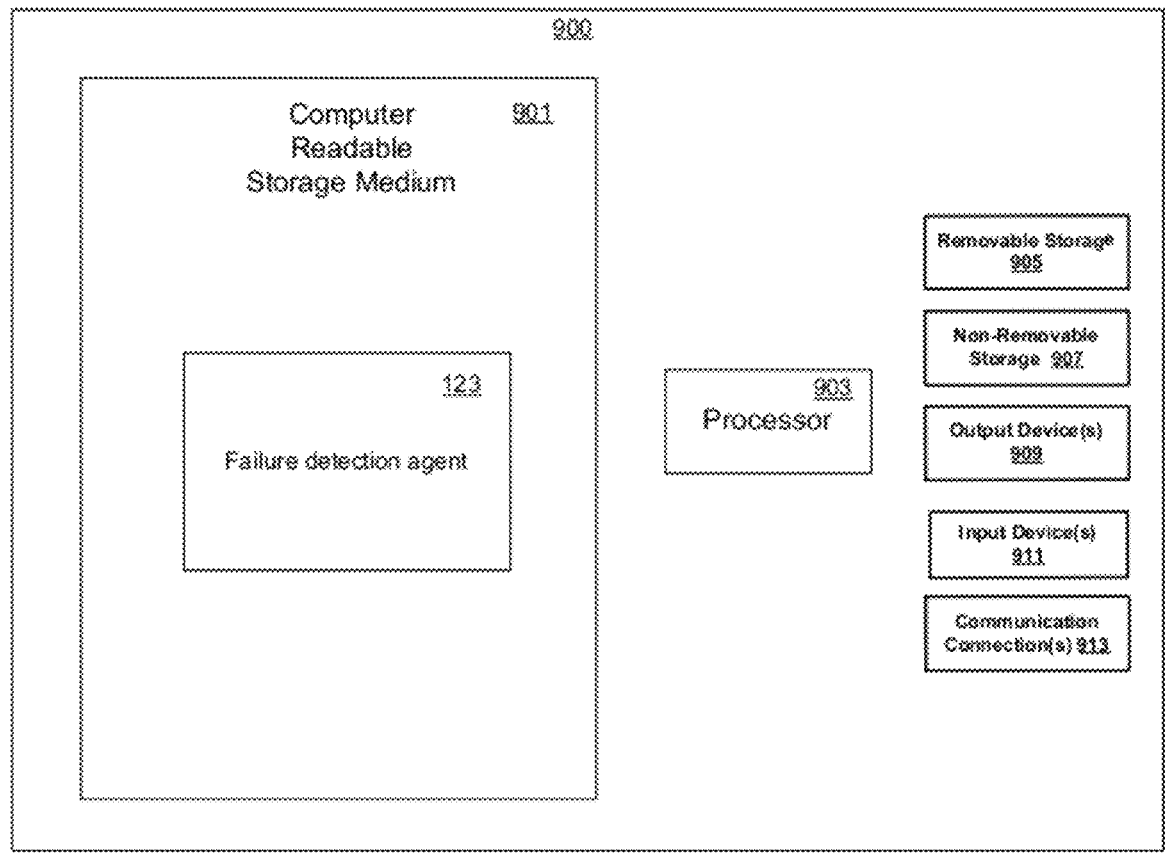
FIG. 9 shows an exemplary computer system in accordance with one embodiment of the present invention.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., failure detection agent 123 from FIG. 1) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901a, non-volatile 901b (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for fast failure detection in a distributed computer system, comprising:
    executing a distributed computer system having a plurality of clusters comprising at least a first cluster, a second cluster and the third cluster;
    initializing failure detection by creating a connected cluster list in each of the plurality of clusters, wherein for each one of the plurality of clusters, a respective connected cluster list describes others of the plurality of clusters said each one is communicatively connected with;
    sending a status update message upon a change in connectivity between the plurality of clusters;
    generating an updated connected cluster list in each of the plurality of clusters in accordance with the status update message; and
    determining whether the change in connectivity is a result of a cluster failure by examining the updated connected cluster list in each of the plurality of clusters;
    wherein upon receiving a loss of communication status update message from the second cluster, the third cluster removes the first cluster from a connected cluster list of the second cluster, and wherein the third cluster checks a connected cluster list of the third cluster to determine whether the third cluster is connected to another cluster to which the first cluster is also connected.

2. The method of claim 1, further comprising determining whether the change in connectivity is a result of a communications link failure by examining the updated connected cluster list in each of the plurality of clusters.

3. The method of claim 1, wherein the status update message comprises a name of a cluster with which a connection was established or broken.

4. The method of claim 1, wherein each of the plurality of clusters maintains a respective connected cluster list created by others of the plurality of clusters.

5. The method of claim 1, wherein at the time of establishing a communication link, each of the plurality of clusters updates and exchanges their respective connected cluster list with others of the plurality of clusters.

6. The method of claim 1, wherein the third cluster declares a failure of the first cluster and updates its respective connected cluster list accordingly, when the third cluster is not connected to another cluster to which the first cluster is also connected.

7. The method of claim 1, wherein the third cluster recognizes the health of the first cluster and updates its respective connected cluster list accordingly, when the third cluster is connected to another cluster to which the first cluster is also connected.

8. A computer readable storage medium having stored thereon, computer executable instructions that, if executed by a computer system cause the computer system to perform a method comprising:
    executing a distributed computer system having a plurality of clusters comprising at least a first cluster, a second cluster and the third cluster;
    initializing failure detection by creating a connected cluster list in each of the plurality of clusters, wherein for each one of the plurality of clusters, a respective connected cluster list describes others of the plurality of clusters said each one is communicatively connected with;

sending a status update message upon a change in connectivity between the plurality of clusters;

generating an updated connected cluster list in each of the plurality of clusters in accordance with the status update message; and determining whether the change in connectivity is a result of a cluster failure by examining the updated connected cluster list in each of the plurality of clusters;

wherein upon receiving a loss of communication status update message from the second cluster, the third cluster removes the first cluster from a connected cluster list of the second cluster, and wherein the third cluster checks a connected cluster list of the third cluster to determine whether the third cluster is connected to another cluster to which the first cluster is also connected.

9. The computer readable storage medium of claim 8, further comprising determining whether the change in connectivity is a result of a communications link failure by examining the updated connected cluster list in each of the plurality of clusters.

10. The computer readable storage medium of claim 8, wherein each of the plurality of clusters maintains a respective connected cluster list created by others of the plurality of clusters.

11. The computer readable storage medium of claim 8, wherein at the time of establishing a communication link, each of the plurality of clusters updates and exchanges their respective connected cluster list with others of the plurality of clusters.

12. The computer readable storage medium of claim 8, wherein the third cluster declares a failure of the first cluster and updates its respective connected cluster list accordingly, when the third cluster is not connected to another cluster to which the first cluster is also connected.

13. The computer readable storage medium of claim 8, wherein the third cluster recognizes the health of the first cluster and updates its respective connected cluster list accordingly, when the third cluster is connected to another cluster to which the first cluster is also connected.

14. A server computer system, comprising:

a computer system having a plurality of clusters comprising at least a first cluster, a second cluster and a third cluster;

a processor coupled to a computer readable storage media and executing computer readable code which causes the computer system to implement a failure detection agent that functions by:

initializing failure detection by creating a connected cluster list, wherein for each one of the plurality of clusters, a respective connected cluster list describes others of the plurality of clusters said each one is communicatively connected with;

sending a status update message upon a change in connectivity between the plurality of clusters;

generating an updated connected cluster list in in accordance with the status update message; and determining whether the change in connectivity is a result of a cluster failure by examining the updated connected cluster list for each of the plurality of clusters;

wherein upon receiving a loss of communication status update message from the second cluster, the third cluster removes the first cluster from a connected cluster list of the second cluster, and wherein the third cluster checks a connected cluster list of the third cluster to determine whether the third cluster is connected to another cluster to which the first cluster is also connected.

15. The server computer system of claim 14, further comprising determining whether the change in connectivity is a result of a communications link failure by examining the updated connected cluster list for each of the plurality of clusters.

16. The server computer system of claim 14, wherein the status update message comprises a name of a cluster with which a connection was established or broken.

17. The server computer system of claim 14, wherein the server computer system maintains a respective connected cluster list created by each of the plurality of clusters.

18. The server computer system of claim 14, wherein at the time of establishing a communication link, the server computer system updates and exchanges its respective connected cluster list with others of the plurality of clusters.

* * * * *